S. J. FLYNN.
ARMORED TIRE.
APPLICATION FILED FEB. 12, 1920.
1,401,061.
Patented Dec. 20, 1921.
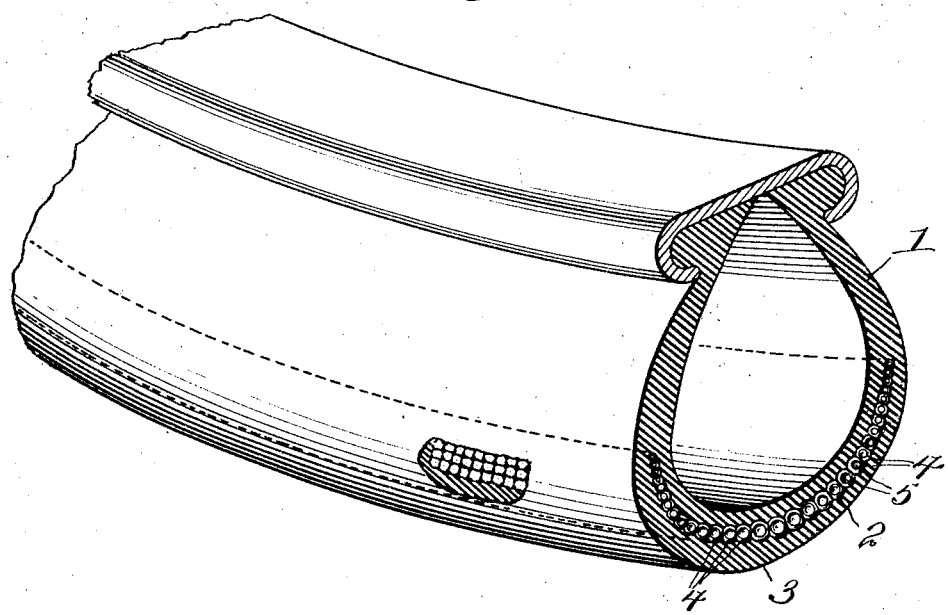
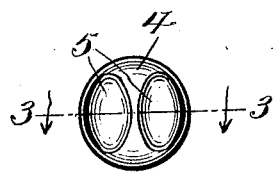
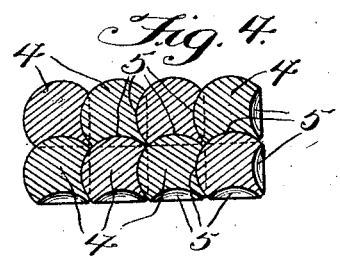
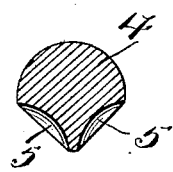
Inventor
Samuel J. Flynn,
By Jas. A. Richmond
Attorney

UNITED STATES PATENT OFFICE.

SAMUEL J. FLYNN, OF PORTSMOUTH, VIRGINIA.

ARMORED TIRE.

1,401,061.

Specification of Letters Patent.

Patented Dec. 20, 1921.

Application filed February 12, 1920. Serial No. 358,252.

*To all whom it may concern:*

Be it known that I, SAMUEL J. FLYNN, a citizen of the United States, residing at Portsmouth, in the county of Norfolk and State of Virginia, have invented certain new and useful Improvements in Armored Tires, of which the following is a specification.

This invention relates to improvements in pneumatic tires, being particularly directed to the provision of means to be incorporated within the tire in the building of the same, and which means will prevent penetration of the tire throughout the area of such means, whereby the tire is substantially puncture proof.

The invention is more particularly directed to the means for securing the puncture-proof condition of the tire, and to this end provides a series of substantially spherical bodies of any appropriate material, but preferably metal, which bodies are introduced beneath the tread layer or layers of the tire, with the bodies so intimately associated as to form a mat throughout the protected area. The bodies are individually formed to provide for their substantial interfitting to form a close mass or layer, the particular formation also and primarily permitting a relative movement of the bodies to avoid interfering with the normal flexibility and elasticity of the tire.

In the drawings:—

Figure 1 is a broken perspective view, illustrating the application of the improved protective means.

Fig. 2 is an enlarged perspective view of one of the elements making up such protective means.

Fig. 3 is a section on line 3—3 of Fig. 2.

Fig. 4 is a sectional fragmentary view of the ball assembly.

The tire, shown at 1 in Fig. 1, is generally of the usual type and construction, and in this connection it is to be understood that the application of the invention to any type of pneumatic tire is contemplated.

The protective layer 2 of the present invention is introduced beneath the tread layer 3 of the tire, and is preferably coextensive with such tread layer, in order to intercept any tire penetrating element picked up in the use of the tire. The protective layer 2 is made of a series of spherical bodies, 4, arranged in close order, but in a single layer, as shown. In order to present as close an association between the ball-bodies as possible, to thereby simulate a solid sheet, the respective ball-bodies 4 are recessed at 5 on the same side of one diametric plane and on opposite sides of a diametric plane at right angles to the first. The recess 5 are thus one one half of the ball-body, and are of a size to permit the interfitting therein of the rounded or spherical surface of adjacent ball-bodies. This arrangement not only insures a close association of the ball-bodies, but of equal importance permits a relative movement of the ball-bodies one on the other, without destroying the close association referred to.

The complete flexibility of the protective layer is thus provided for, and therefore the resiliency of the tire is not materially interfered with by the use of the ball-bodies. The ball-bodies are preferably of metal, though any other appropriate material capable of resisting the penetration of puncturing elements, may be used.

The essential feature of the present invention is the use of the ball-bodies so individually formed as to insure their close association when assembled in layer form, without interfering with that independent movement thereof necessary to desirable flexibility.

Having thus described the invention, what is claimed as new, is:—

1. The combination with a pneumatic tire, of a layer of relatively free ball-bodies arranged as a protective medium for the tread portion of such tire.

2. A pneumatic tire having a layer of relatively free ball-bodies substantially coextensive with the tread portion of such tire, the ball-bodies being formed for interfitting.

3. A pneumatic tire having a layer of relatively free ball-bodies arranged as a layer therein, said bodies being formed for interfitting to provide substantial overlapping without interfering with free relative movement.

4. A pneumatic tire having a layer of ball-bodies, each ball body having spherical recesses to receive portions of adjacent ball-bodies, whereby to provide for interfitting without interfering with complete flexibility.

In testimony whereof I affix my signature.

SAMUEL J. FLYNN.